US010503466B1

(12) United States Patent
Shapiro

(10) Patent No.: US 10,503,466 B1
(45) Date of Patent: Dec. 10, 2019

(54) DETECTING CONTENT CONSUMPTION

(71) Applicant: Google Inc., Mountain View, CA (US)

(72) Inventor: Jody Shapiro, Los Altos Hills, CA (US)

(73) Assignee: Google LLC, Mountain View, CA (US)

(*) Notice: Subject to any disclaimer, the term of this patent is extended or adjusted under 35 U.S.C. 154(b) by 286 days.

(21) Appl. No.: 15/600,308

(22) Filed: May 19, 2017

Related U.S. Application Data

(63) Continuation of application No. 13/945,406, filed on Jul. 18, 2013, now Pat. No. 9,684,929.

(51) Int. Cl.
G06Q 30/00 (2012.01)
G06F 3/16 (2006.01)
G10L 15/30 (2013.01)

(52) U.S. Cl.
CPC ............. G06F 3/167 (2013.01); G10L 15/30 (2013.01)

(58) Field of Classification Search
CPC .......... G06F 21/00; G06F 17/00; G06Q 30/00
USPC ............................ 715/234; 705/14.53, 14.54
See application file for complete search history.

(56) References Cited

U.S. PATENT DOCUMENTS

| 9,172,915 | B2* | 10/2015 | Nicholas | ............ H04N 7/17318 |
| 10,223,458 | B1* | 3/2019 | Decker | ............... G06F 15/0291 |
| 2004/0111308 | A1 | 6/2004 | Yakov | |
| 2004/0203586 | A1 | 10/2004 | Cashiola | |
| 2005/0278241 | A1 | 12/2005 | Reader | |
| 2006/0190387 | A1 | 8/2006 | Molloy | |
| 2006/0190388 | A1 | 8/2006 | Molloy | |
| 2006/0190389 | A1 | 8/2006 | Molloy | |
| 2006/0190390 | A1 | 8/2006 | Molloy | |
| 2006/0287916 | A1 | 12/2006 | Starr et al. | |
| 2008/0114671 | A1 | 5/2008 | Goel et al. | |
| 2008/0244038 | A1* | 10/2008 | Martinez | ................ G06Q 30/02 709/218 |
| 2009/0024452 | A1 | 1/2009 | Martinez et al. | |
| 2009/0222551 | A1* | 9/2009 | Neely | .................... G06F 16/951 709/224 |
| 2009/0265243 | A1* | 10/2009 | Karassner | ............. G06Q 30/02 705/14.54 |
| 2009/0276419 | A1* | 11/2009 | Jones | ..................... G06F 16/332 |

(Continued)

OTHER PUBLICATIONS

U.S. Notice of Allowance on U.S. Appl. No. 13/945,406 dated Feb. 21, 2017.

(Continued)

Primary Examiner — Oluseye Iwarere
(74) Attorney, Agent, or Firm — Foley & Lardner LLP

(57) ABSTRACT

Methods, systems, and apparatus, including computer programs encoded on a computer storage medium, for providing content are disclosed. In one aspect, a set of interaction data specifying one or more types of user interactions with a resource is received for a user. A determination is made, based on the interaction data, that the user is in a first engagement category from at least two different engagement categories. A request for a content item to be provided to the user is received. A content item having a bid specifying an amount that a content item provider is willing to pay for distribution of the content item to a user in the first engagement category is identified. A determination is made, based on the outcome of an auction performed using the bid, that the bid is a winning bid. The content item is provided for presentation in response to the request.

20 Claims, 8 Drawing Sheets

(56) References Cited

U.S. PATENT DOCUMENTS

| | | | | |
|---|---|---|---|---|
| 2009/0299853 | A1* | 12/2009 | Jones | G06Q 30/02 705/14.46 |
| 2010/0082652 | A1* | 4/2010 | Jones | G06Q 30/02 707/758 |
| 2010/0115060 | A1* | 5/2010 | Julia | G06Q 30/02 709/219 |
| 2010/0257058 | A1 | 10/2010 | Karidi et al. | |
| 2010/0293049 | A1* | 11/2010 | Maher | G06Q 30/02 705/14.46 |
| 2010/0293050 | A1* | 11/2010 | Maher | G06Q 30/02 705/14.46 |
| 2010/0293058 | A1* | 11/2010 | Maher | G06Q 30/02 705/14.66 |
| 2010/0318426 | A1* | 12/2010 | Grant | G06Q 20/10 705/14.66 |
| 2011/0054960 | A1* | 3/2011 | Bhatia | G06Q 30/02 705/7.12 |
| 2011/0066497 | A1* | 3/2011 | Gopinath | G06Q 30/02 705/14.53 |
| 2011/0208822 | A1* | 8/2011 | Rathod | G06F 16/9535 709/206 |
| 2011/0258529 | A1* | 10/2011 | Doig | G06Q 30/02 715/234 |
| 2011/0289419 | A1* | 11/2011 | Yu | G06F 9/44526 715/738 |
| 2011/0307496 | A1* | 12/2011 | Jones | G06F 16/24 707/748 |
| 2012/0030034 | A1 | 2/2012 | Knapp et al. | |
| 2012/0095834 | A1* | 4/2012 | Doig | G06F 16/9535 705/14.53 |
| 2013/0060629 | A1* | 3/2013 | Rangsikitpho | G06Q 30/02 705/14.42 |
| 2013/0262494 | A1* | 10/2013 | Petersen | G06Q 10/10 707/758 |
| 2014/0250145 | A1* | 9/2014 | Jones | G06Q 10/101 707/769 |
| 2015/0039459 | A1 | 2/2015 | Hummel | |
| 2016/0225059 | A1* | 8/2016 | Chow | G06F 16/22 |
| 2018/0047072 | A1* | 2/2018 | Chow | G06Q 30/0263 |

OTHER PUBLICATIONS

U.S. Office Action on U.S. Appl. No. 13/945,406 dated Mar. 21, 2016.

U.S. Office Action on U.S. Appl. No. 13/945,406 dated Dec. 2, 2016.

* cited by examiner

DETECTING CONTENT CONSUMPTION

CROSS-REFERENCE TO RELATED PATENT APPLICATION

The present application is a continuation of and claims priority to U.S. patent application Ser. No. 13/945,406, entitled "DETECTING CONTENT CONSUMPTION", filed Jul. 18, 2013, which is incorporated herein by reference in its entirety

BACKGROUND

This specification relates to data processing and content distribution.

The Internet facilitates the exchange of information and transactions between users across the globe. This exchange of information enables content item providers to provide sponsored content to a variety of users. A content item provider can control the distribution of their content items (e.g., promotions, advertisements, audio files, video files, or other content items) based on a set of distribution parameters that specify under what conditions a content item is eligible to be distributed. When a presentation opportunity meeting the conditions is available, the content item provided by a content item provider is deemed eligible to be provided for presentation.

SUMMARY

In general, one innovative aspect of the subject matter described in this specification can be embodied in methods that include the actions of receiving, for a user, a first set of interaction data specifying one or more types of user interactions with a resource over a first period of time and a rate with which at least one of the types of user interactions occurred; determining, based on the user interaction data, that the user is in a first engagement category from at least two different engagement categories; receiving a request for a content item to be provided to the user; identifying a content item having a first bid specifying a first amount that a content item provider is willing to pay for distribution of the content item to a user in the first engagement category; determining, based on the outcome of an auction performed using the first bid, that the first bid is a winning bid; and providing the content item for presentation in response to the request based on the first bid being determined to be the winning bid.

Other embodiments of this aspect include corresponding systems, apparatus, and computer programs, configured to perform the actions of the methods, encoded on computer storage devices. These and other embodiments can each optionally include one or more of the following features.

Methods can include operations including receiving, from the content item provider, distribution criteria specifying that the content item is eligible to be provided to users that are associated with the first engagement category; receiving, from the content item provider, the first bid; receiving, from the content item provider, distribution criteria specifying that the content item is eligible to be provided to users that are associated with a second engagement category, the second engagement category corresponding to a lower level of engagement with content of the resource than the first engagement category; and receiving, from the content item provider, a second bid specifying a second amount that the content item provider is willing to pay for distribution of the content item to a user in the second engagement category, the second bid being different than the first bid.

Methods can include operations including receiving updated interaction data specifying one or more types of user interactions with a resource over a second period of time different from the first period of time; determining, based on the updated interaction data, that the user is in the second engagement category; receiving a second request for a content item to be provided to the user; determining whether the second bid is a winning bid for a second auction; and providing, in response to the second request, a content item associated with the winning bid for the second auction.

Methods can include operations including providing a campaign management interface that enables a content item provider to select, for the first content item one or more engagement categories to be associated with the content item, the association of an engagement category with the content item indicating that the content item is eligible for distribution to users determined to be in the engagement category.

Receiving updated interaction data can include receiving interaction data that deviates from a reference set of interaction data for the user; and determining that the user is in a second engagement category comprises determining, based on the deviation, that the user is in the second engagement category.

Determining that the user is in the first engagement category can include: determining, based on the interaction data, a first set of user interactions that preceded a particular interaction with a content item provided in response to a previous content item request; determining that a matching set of user interactions were performed within a pre-specified amount of time prior to the request, the matching set of user interactions being user interactions that match the first set of user interactions; and determining that the user is in the first engagement category based on the determination that the matching set of user interactions were performed within the pre-specified amount of time prior to the request.

Methods can include operations including receiving presentation data for two or more presentations of a document, the presentation data for each presentation specifying one or more portions of the document that were presented at a user device; receiving user interaction data representing user interactions with one or more portions of content presented in the one or more portions of the document, the user interaction data specifying a type of user interaction with the portion of content and a rate at which at least one of the user interaction types occurred while the document was presented at the user device; determining, based on the interaction data, a measure of readership for the one or more portions of content, the measure of readership for each portion specifying a portion of users that read the portion of content, the determination being based, at least in part, on a speed of occurrence for at least one user interaction being within a range corresponding to content being read; and providing a reader profile for the document based on the measure of readership for the one or more portions of content.

Determining that the user is in the first engagement category can include determining that the user is in a content reader category rather than a content skimmer category.

The engagement categories can each be associated with context information. The request for the content item can include first context information describing the context of the request. Determining that the user is in the first engagement category can include matching the first context information to second context information associated with the first engagement category.

The first context information can include one or more of a time of day of the request, a day of week of the request, a time of year of the request, a location of the request, or a type of content included in the resource.

The first set of interaction data can specify aggregate user interaction data for multiple different users.

Methods can include operations including modifying content of the resource based on determining that the user is in the first engagement category.

Particular embodiments of the subject matter described in this specification can be implemented so as to realize none, one or more of the following advantages. A content provider can specify different bids specifying what the content provider is willing to pay for presentation of a content item to users who are in different engagement categories (e.g., based on their differing levels of engagement with content provided to the users). A readership profile can be provided to a publisher of a document. Content can be provided to a user based on a level of engagement of the user with the content.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

One or more data processing apparatus can distribute content items to a user based, at least in part, on an engagement category to which the user has been assigned. The engagement category for a particular user can be selected, for example, based on a level of interaction by the user with content that has been presented to the user. Users can perform various interactions with content that are presented on a user device. For example, a user can move a cursor over the content, highlight content, scroll the content, etc. Such interactions and/or the rate of such interactions can indicate a user's engagement with the content. For example, some users may move their cursor over content while they read the content. As another example, a rate of scrolling of content can indicate whether the user may have read or merely skimmed the content.

In some implementations, a determination is made, based on current and historical user interaction data, that the user is in a particular engagement category (e.g., "content reader" rather than "content-skimmer"). In response to a request for a content item to be provided to the user device, a content item can be selected based, at least in part, on the engagement category of the user. For example, a content provider can provide a content item having a bid specifying an amount that the content item provider is willing to pay for distribution of the content item to a user in a particular engagement category. A content distribution system can determine that the user is in the particular engagement category and that such a bid is a winning bid in an auction performed in response to the request for content, and can provide the content item to the user device, for presentation on the user device.

For situations in which the systems discussed here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from a content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by the content server.

Figure 1:
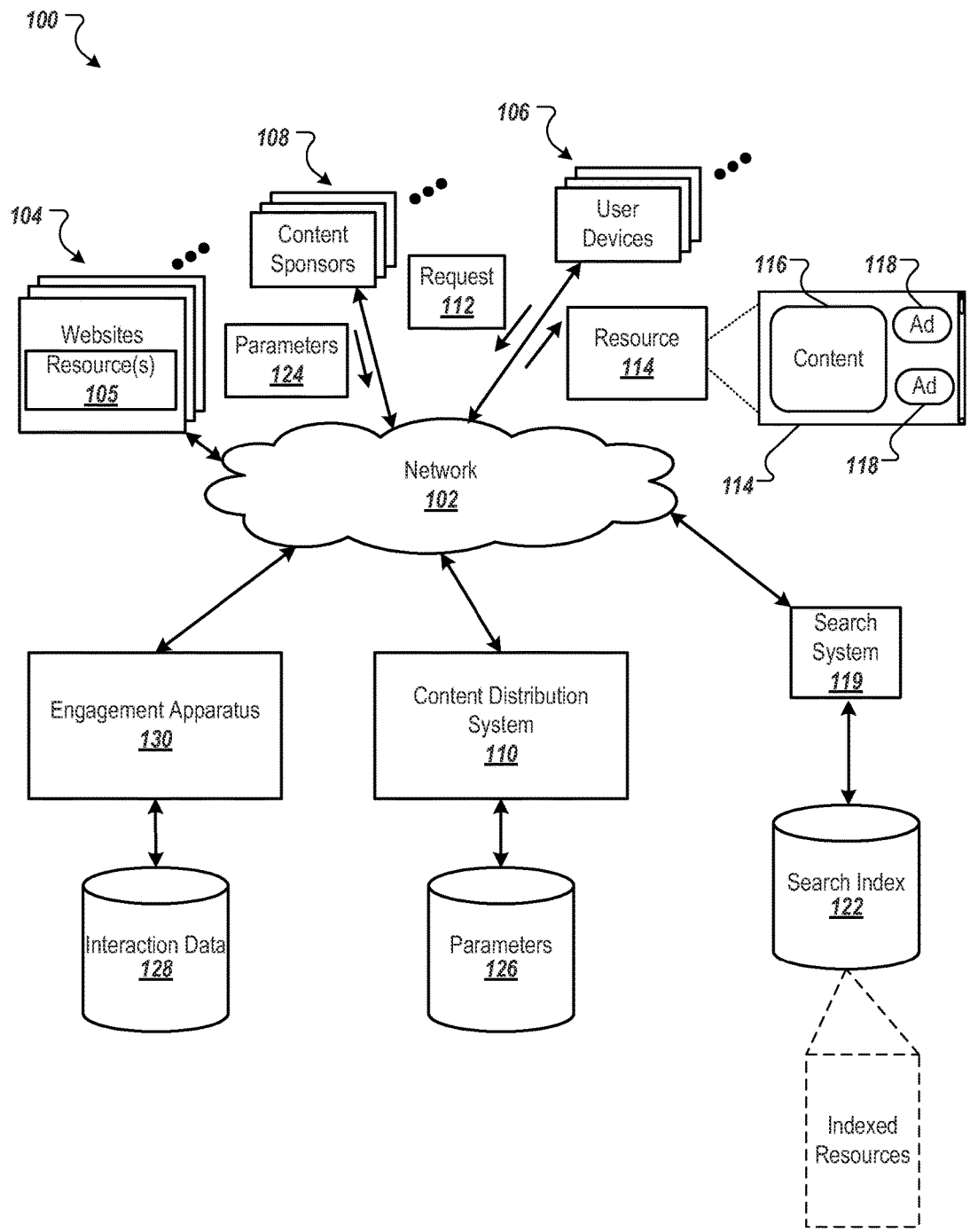
FIG. 1 is a block diagram of an example environment in which content is distributed to user devices.

FIG. 1 is a block diagram of an example environment 100 in which content is distributed to user devices 106. The example environment 100 includes a network 102, such as a local area network (LAN), a wide area network (WAN), the Internet, or a combination thereof. The network 102 connects websites 104, user devices 106, content sponsors 108, and a content distribution system 110. The example environment 100 may include many different websites 104, user devices 106, and content sponsors 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). Units of content that are presented in (or with) resources are referred to as content items, and an individual content item can be stored in a single file or set of files independent of the resource.

A user device 106 is an electronic device that is capable of requesting and receiving resources over the network 102.

Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, web page from a social network, or another resource 105. The data representing the requested resource 114 can include data that cause presentation of resource content 116 at the user device 106. The data representing the requested resource 114 can also include data specifying content item slots 118. A content item slot is a portion of the resource (e.g., a portion of a web page) or a portion of a user display (e.g., a presentation location of another window or in a slot of a web page) in which content items, such as advertisements, can be presented. Content items slots 118 can also be referred to as advertisement slots, but any type of content (e.g., content items other than advertisements) can be presented in these content item slots 118.

To facilitate searching of these resources, the environment 100 can include a search system 119 that identifies the resources by crawling and indexing the resources provided by the publishers on the websites 104. Data about the resources can be indexed based on the resource with which the data are associated. The indexed and, optionally, cached copies of the resources are stored in a search index 122. Data that are associated with a resource is data that represents content included in the resource and/or metadata for the resource.

User devices 106 can submit search queries to the search system 119 over the network 102. In response, the search system 119 accesses the search index 122 to identify resources that are relevant to the search query. The search system 119 identifies the resources in the form of search results and returns the search results to the user device in search results page. A search result is data generated by the search system 119 that identifies a resource that is responsive to a particular search query, and includes a link to the resource. An example search result can include a web page title, a snippet of text or a portion of an image extracted from the web page, and the URL of the web page. Like other resources, search results pages can include one or more content item slots in which content items, such as advertisements, can be presented.

When a resource 105 is requested by a user device 106, execution of code associated with a slot in the resource initiates a request for a content item to the content distribution system 110 to populate the slot. Based, for example, on data included in the request for content, the content distribution system 110 can select content items that are eligible to be provided in response to the request, such as content items having characteristics matching the characteristics of a given slot. As another example, content items having distribution criteria (e.g., keywords) that match the resource keywords or a search query may be selected as eligible content items by the content distribution system 110. One or more selected content items can be provided to the user device 106 in association with providing an associated resource 105 or search results.

In some implementations, the content distribution system 110 can select content items based at least in part on results of an auction. For example, an auction can be performed and the slots can be allocated to content sponsors 108 according, among other factors, to their bids and/or the relevance of a content item to content presented on a page hosting the slot or a request that is received for the content item. For example, when a slot is being allocated in an auction, the slot can be allocated to the content sponsor 108 that provided the highest bid or has a highest auction score (e.g., a score that is computed as a function of a bid and/or a quality measure). When multiple slots are allocated in a single auction, the slots can be allocated to a set of bidders that provided the highest bids or have the highest auction scores.

A content sponsor 108 or content provider can create a content campaign associated with one or more content items using tools provided by the content distribution system 110. For example, the content distribution system 110 can provide one or more account management user interfaces for creating and managing content campaigns. The account management user interfaces can be made available to the content sponsor 108, for example, either through an online interface provided by the content distribution system 110 or as an account management software application installed and executed locally at a content sponsor's client device.

A content sponsor 108 can, using the account management user interfaces, provide campaign parameters 124 which define a content campaign. The content campaign can be created and activated for the content sponsor 108 according to the campaign parameters 124 specified by the content sponsor 108. The campaign parameters 124 can be stored in a parameters data store 126. Campaign parameters 124 can include, for example, a campaign name, a preferred content network for placing content, a budget for the campaign, start and end dates for the campaign, a schedule for content placements, content items (e.g., creatives), bids, and distribution criteria. Distribution criteria can include, for example, a language, one or more geographical locations or websites, and/or one or more selection terms.

A bid for a content item can represent, for example, an amount that the content sponsor 108 is willing to spend for presentation of the content item. As a more particular example, a bid can specify an amount that the content sponsor 108 is willing to pay for distribution of a content item to a user in a particular engagement category. As yet another example, a bid can specify an amount the content sponsor 108 is willing to pay for distribution of a content item to a user whose engagement category has recently changed to a particular engagement category.

An engagement category can describe a user's historical or recent interaction with content, including a rate of interaction. For example, a determination may be made that a user generally reads at least a threshold amount of the content of a presented resource, or that the user generally reads particular portions of a presented resource. As another example, a determination may be made that the user consumes content of a resource at a threshold rate or slower, indicating that the user is reading rather than skimming quickly through presented content. The user may be classified as being in a "content reader" engagement category based on such determinations. As another example, a user may be classified as being in a "content skimmer" engagement category based on a determination that the user generally scrolls quickly through content of a presented resource. Other engagement categories and groups of engagement categories can be used. For example, engagement categories can include "highly-engaged", "moderately-engaged", and "slightly-engaged".

A user's engagement category can be determined based on interaction data 128 received by an engagement apparatus 130. The interaction data 128 can be collected, for example, by one or more scripts provided by the engagement apparatus 130 or the content distribution system 110. The one or more scripts can be provided, for example, in content items that are presented in the content item slots 118. The one or more scripts can determine, for example, content of the resource 114 that is possible to be read (e.g., content that is on screen), content that a user is reading and a rate at which the content is being read, and any interactions that the user performs in association with the content.

The engagement apparatus 130 can collect and store interaction data for different users over time. A current and one or more historical engagement categories can be maintained on a per-user basis. A current (e.g., recent) engagement category can be determined, for example, based on interactions occurring within a predetermined amount of time (e.g., one hour, one day, one week) from the current time. In some implementations, a user's engagement category can differ and be separately determined for different device types that are used by the user (e.g., mobile, desktop) and/or for different resources or types of resources (e.g., sports content, news content) that are provided to the user device.

The engagement apparatus 130 can compare a user's current engagement category to various, other engagement categories. For example, a current engagement category of the user can be compared to a historical engagement category for the user. As a more particular example, a current engagement category for a particular type of content (e.g., sports content) consumed on a particular type of device (e.g., mobile) can be compared to a historical engagement category for the user for that type of content on that type of device. Other examples include comparing a user's current engagement category to an engagement category representative of users in general.

The engagement apparatus 130 can determine, based on a comparison of the current engagement category to some other engagement category, that the user's current engagement category, for example, is of a higher or lower level of engagement than the historical engagement category for the user. As another example, the engagement apparatus 130 can determine that the user's current engagement category is higher or lower than an engagement category representative of users in general.

As another example, the engagement apparatus 130 can compare a user's current engagement category or a user's recent interactions to an engagement category or set of interactions previously determined to be associated with a particular likelihood that the user may perform a particular interaction (e.g., a selection of an advertisement or performance of a conversion). The engagement apparatus 130 can determine a likelihood that the user may perform the particular interaction (e.g., conversion) based on such a comparison. The engagement apparatus 130 can provide information regarding a user's historical engagement categories or a user's current level of engagement to the content distribution system 110.

In response to a request for content from a user device 106, the content distribution system 110 can select a content item based, at least in part, on the user's current engagement category, based on a detected change in the user's engagement category, or based on a comparison of the user's current engagement category to some other engagement category. For example, an auction can be conducted in response to the request for content, and the content distribution system 110 can identify a content item having a bid that indicates an amount a content sponsor 108 will pay for distribution of the content item to a user in a particular engagement category. A determination can be made that the bid is a winning bid for the auction, and in response to such a determination, the content item can be provided to the requesting user device 106.

Figure 2:
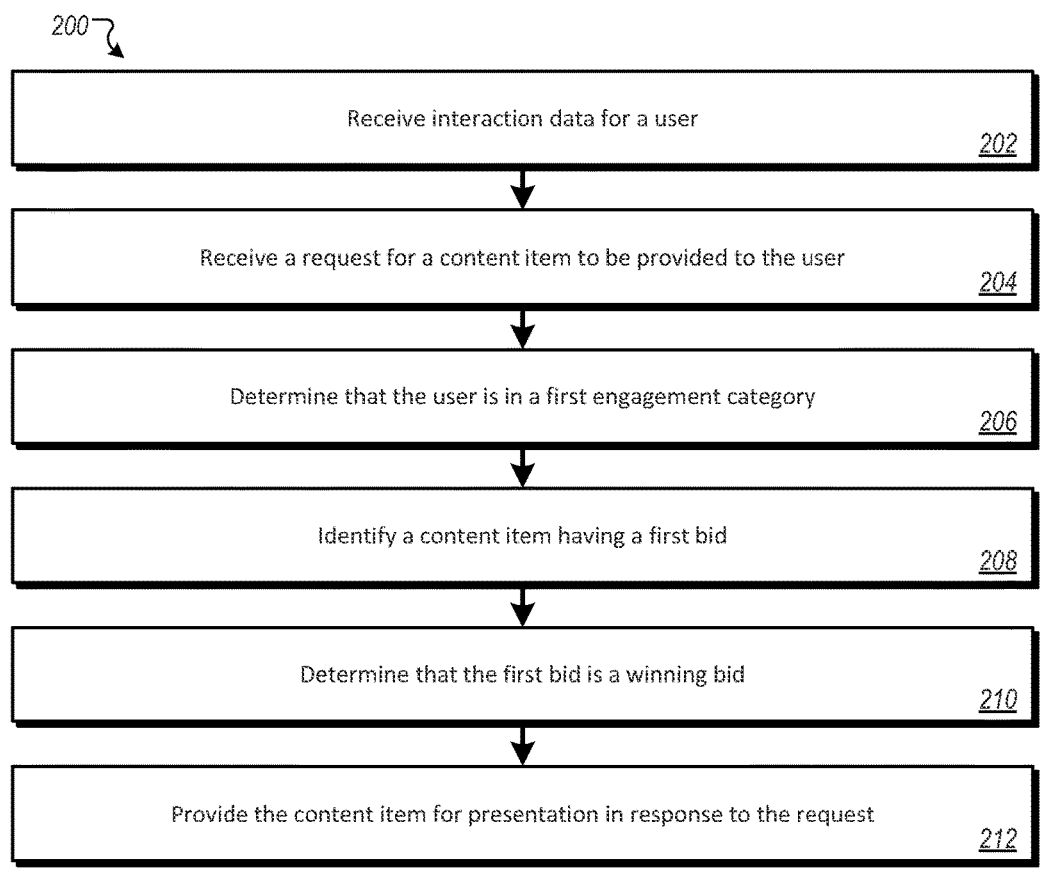
FIG. 2 is a flow chart of an example process for providing content.

FIG. 2 is a flow chart of an example process 200 for providing content. The process 200 can be performed by one or more data processing apparatus, such as the content distribution system 110 and/or the engagement apparatus 130 of FIG. 1. Operations of the process 200 can be implemented by execution of instructions stored on a non-transitory computer readable medium and that cause one or more data processing apparatus to perform operations of the process 200.

A first set of interaction data is received for a user (202). The first set of interaction data can specify, for example, one or more types of user interactions with a resource over a first period of time and a rate with which at least one of the types of user interactions occurred. The interaction data can be received, for example, from one or more scripts that are provided to a user device in association with the presentation of the resource at the user device. In some implementations, the interaction data can include context information associated with the interactions, such as a time of day, day of week, time of year, and location of the user when a particular interaction occurred. In some implementations, the interaction data includes data that is specific to the user. In some implementations, the interaction data specifies aggregate user interaction data for users in general and does not include interaction data specific to the user, The one or more scripts can determine, for example, content of the resource that is able to be consumed. For example, the one or more scripts can determine if the entire resource, including dynamic content, was successfully loaded and rendered. As another example, the one or more scripts can determine what content of the resource is on-screen versus off-screen (e.g., "above-the-fold" versus "below-the-fold"). For example, the one or more scripts can determine one or more display characteristics of the user device and an amount of the resource that is able to be presented on a display having such characteristics.

The interaction data can indicate content that was consumed (e.g., read) by the user. For example, the one or more scripts can generate interaction data that corresponds to a user's use of various input devices or controls which can indicate content on which a user is focused. For example, cursor interaction with text (e.g., a user moving a mouse pointer over words they are reading), selection of text (e.g., a user selecting text that they are reading, as a visual placeholder), and scrolling input (e.g., horizontal and/or vertical scrolling) can indicate content the user is reading.

Other interaction data can indicate that the user has consumed particular portions of content. For example, the interaction data may indicate that the user copied text or an image to a clipboard. As another example, the interaction data may indicate that the user selected and downloaded a copy of an image.

The interaction data can include timing data which correspond to rates of interaction with content. A rate with which interactions occurred can indicate, for example, whether the user consumed (e.g., read) content, skipped the content, or skimmed certain portions of content. For example, the timing data can indicate a rate of cursor (e.g., mouse) movement over text portions, a rate of scrolling input, and an amount of time that portions of the content were on-screen (e.g., content may become off-screen due to scrolling input, a closing or obscuring of a browser window, or the loading of a different resource in the browser).

The interaction data can indicate an order that content of the resource was consumed. For example, the interaction data can indicate whether the user consumed the content of the resource from top to bottom, or whether the user consumed the content in some other order, such as reading the beginning, reading the end, and then reading a middle portion. As another example, the interaction data can indicate that the user read a particular topmost portion (e.g., fifty percent of the content of the resource) but not the remainder of the resource.

A request for a content item to be provided to the user is received (204). For example, the request can be for a content item that will be presented in a content item slot included in the resource. The request can include characteristics of the content item slot and an identifier corresponding to the user (e.g., a number string corresponding to an account for the user). The request can include context information associated with context of the request, such as time and date information, and/or location information.

A determination is made, based on the user interaction data, that the user is in a first engagement category, from at least two different engagement categories (206). For example, a determination can be made that the user is in a content reader category rather than a content skimmer category. The determination of the user's current engagement category can be based, for example, on recent interactions occurring within a predetermined amount of time (e.g., one hour, ten minutes, one day) from the current time. The determination can include determining that the user's current engagement category is different from a previous engagement category associated with the user (e.g., the previous engagement category may be a content skimmer category and the determined current engagement category may be a content reader category).

In some implementations, some or all of the engagement categories are associated with context information. For example, an engagement category can be associated with one or more time-related labels, such as "Monday morning", "weekday morning", or "weekend evening". As other examples and in general, the content information associated with an engagement category can include one or more of a time of day of the request, a day of week of the request, a time of year of the request, a location of the request, or a type of content included in the resource (e.g., sports content, general news content).

The request for the content item can include context information describing the context of the request and determining that the user is in the first engagement category can include matching the context information included in the request to context information associated with the first engagement category. For example, determinations can be made that the time of the request is "Monday morning", which based on historical data may indicate that the user is likely reading rather than skimming content of the resource, and a determination can be made that a content type of the resource is "sports content". Based on these determinations, the user can be identified as being in a first engagement category of "Monday morning sports-content reader".

In some implementations, the resource is modified based on determining that the user is in the first engagement category. For example, if the user is in a first engagement category of "Monday morning sports-content reader", the resource can be modified to present a full article of sports-related content at the top of the resource, whereas the resource may generally only include snippets of articles when the user is determined to be skimming content for short periods of time (e.g., during mid-week working hours) rather than taking the time to read a full article.

A content item having a first bid is identified (208). In some implementations, the first bid specifies a first amount that a content item provider is willing to pay for distribution of the content item to a user in the first engagement category. The bid can be, for example, a CPM (Cost Per Mille) bid, which is an amount the content item provider is willing to pay for distribution of the content item to one thousand users in the first engagement category. In another example, the bid can be a CPC (Cost Per Click) or CPA (Cost Per Action) bid. A CPC bid specifies an amount that the content item provider is willing to pay for a user click of the content item, and a CPA bid specifies an amount that the content item provider is willing to pay for some pre-specified action, such as a user conversion (e.g., a sale).

A determination is made, based on the outcome of an auction performed using the first bid, that the first bid is a winning bid (210). The auction can be performed and a slot associated with the auction can be allocated to a content item provider according, among other factors, to provided bids and/or the relevance of a content item to content presented on a page hosting the slot. For example, the slot can be allocated to the content item provider that provided the highest bid or has a highest auction score (e.g., a score that is computed as a function of a bid and/or a quality measure).

The content item is provided for presentation in response to the request based on the first bid being determined to be the winning bid (212). For example, the content item can be provided to a user device which submitted the request for content, for presentation on the user device.

Figure 3:
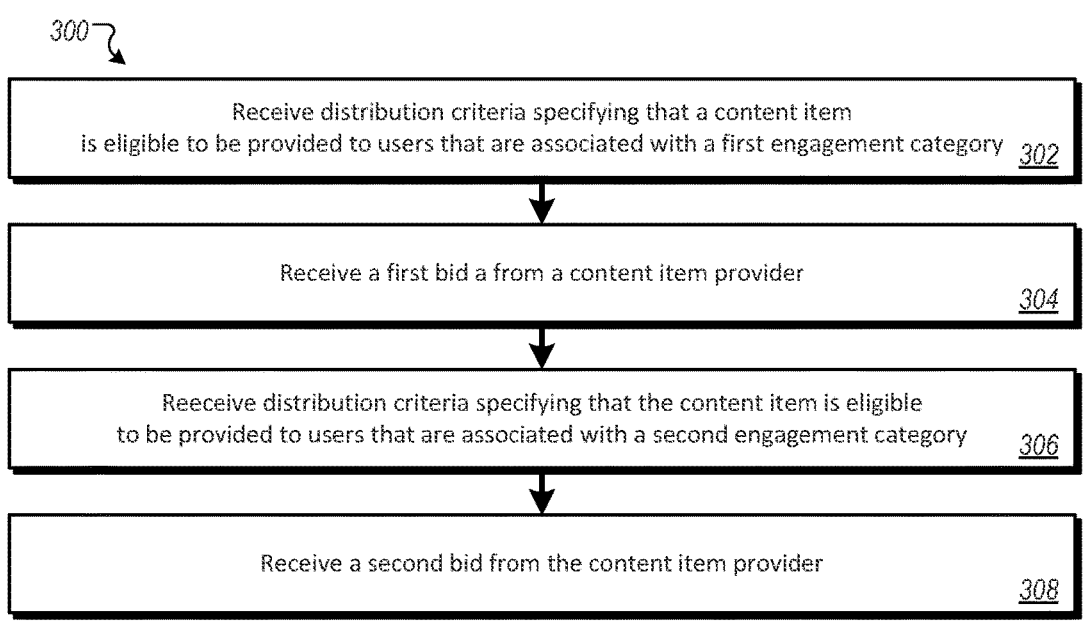
FIG. 3 is a flow chart of an example process for configuring distribution of a content item.

FIG. 3 is a flow chart of an example process 300 for configuring distribution of a content item. The process 300 can be performed by one or more data processing apparatus, such as the content distribution system 110 and/or the engagement apparatus 130 of FIG. 1. Operations of the process 300 can be implemented by execution of instructions stored on a non-transitory computer readable medium and that cause one or more data processing apparatus to perform operations of the process 300.

Distribution criteria specifying that the content item is eligible to be provided to users that are associated with the first engagement category is received from a content item provider (302). In some implementations, the distribution criteria are received through a campaign management user interface.

Figure 4:
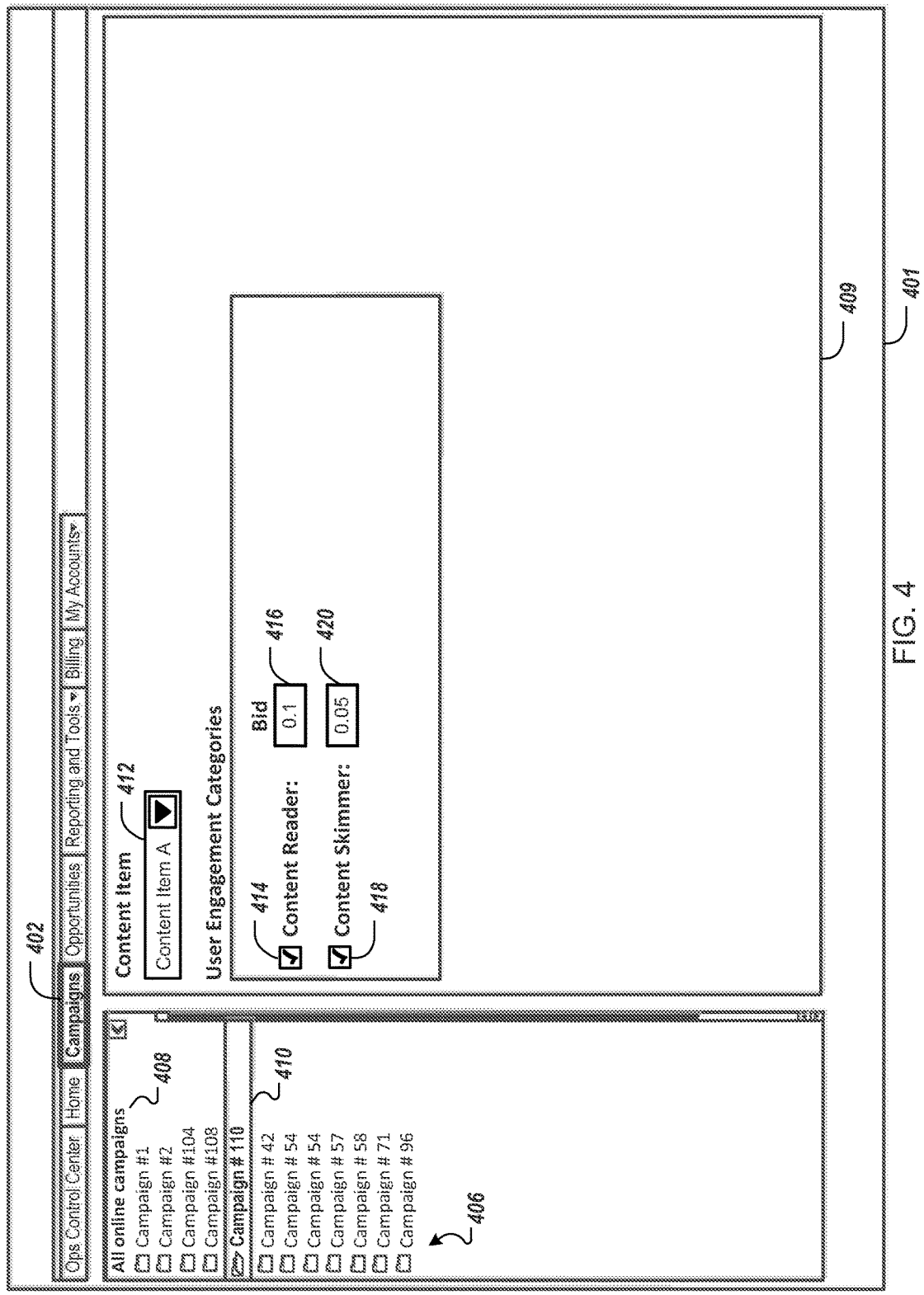
FIG. 4 illustrates an example campaign management user interface through which distribution criteria can be received.

FIG. 4 illustrates an example campaign management user interface 400 through which distribution criteria can be received. The user interface 400 can be included, for example, in one or more user interfaces that a user, such as a content item provider, can use to configure a content distribution campaign. The content item provider can view a list 406 of campaigns by selecting a control 408 and can edit an existing campaign in a campaign configuration area 409 by selecting the name of an existing campaign (e.g., a name 410) in the campaign list 406. In the campaign configuration area 409, the content item provider can select a content item associated with the campaign using a control 412. The content item provider can indicate that the selected content item is eligible to be provided to users that are associated with a "content reader" engagement category by selecting a control 414.

Referring again to FIG. 3, the first bid is received from the content item provider (304). For instance, in the example user interface 400 of FIG. 4, the content item provider can specify a first bid using a control 416, where the first bid specifies an amount that the content item provider is willing to pay for distribution of the selected content item to a user in the content reader engagement category.

Distribution criteria specifying that the content item is eligible to be provided to users that are associated with a second engagement category is received from the content item provider (306). In some implementations, the second engagement category corresponds to a lower level of engagement with content of the resource than the first engagement category. For instance, in the example user interface 400 of FIG. 4, the content item provider can indicate that the selected content item is eligible to be provided to users that are associated with a "content skimmer" engagement category by selecting a control 418. The content skimmer category can correspond to a lower level of engagement with content of the resource than the content reader category.

A second bid specifying a second amount that the content item provider is willing to pay for distribution of the content item to a user in the second engagement category is received from the content item provider (308). In some implementations, the second bid is different than the first bid. For instance, in the example user interface 400 of FIG. 4, the content item provider can specify a second bid using a control 420, where the second bid specifies an amount that the content item provider is willing to pay for distribution of the selected content item to a user in the content skimmer engagement category. In this example, the content item provider is willing to pay less for presentation of a content item to a user in the content skimmer category than for presentation of a content item to a user in the content reader category.

Figure 5:
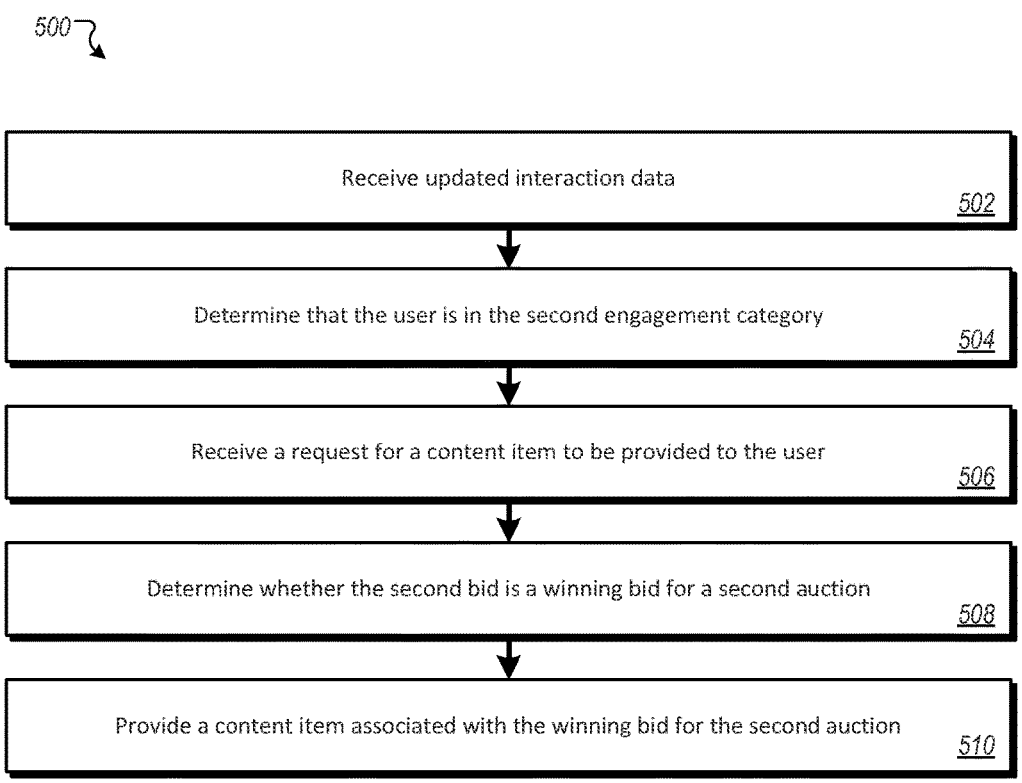
FIG. 5 is a flow chart of an example process for providing content.

FIG. 5 is a flow chart of an example process 500 for providing content. The process 500 can be performed by one or more data processing apparatus, such as the content distribution system 110 and/or the engagement apparatus 130 of FIG. 1. Operations of the process 500 can be implemented by execution of instructions stored on a non-transitory computer readable medium and that cause one or more data processing apparatus to perform operations of the process 500.

Updated interaction data specifying one or more types of user interactions with a resource over a second period of time different from a first period of time is received (502). For example, the updated interaction data can be data that deviates from a reference set of interaction data for the user and/or is received at a later time than the reference set of interaction data. In some implementations, the reference set of interaction data correspond to user interactions that occurred during a first period of time, and the updated interaction data correspond to subsequent user interactions that occurred during a second period of time that differs from the first period of time.

A determination is made, based on the updated interaction data, that the user is in the second engagement category (504). For example, the user may have been previously in a content reader category, but a determination can be made, based on the updated interaction data, that the user is currently in a content skimmer category. For example, recent interaction data in the updated interaction data may indicate that the user has recently been scrolling quickly through content (e.g., scrolling faster than would enable the reader to completely read the content). In some implementations, the determination is based on a deviation in a rate of consumption of content between the updated interaction data and a reference set of interaction data for the user. For example, if the content consumption rate deviates by more than a threshold amount, the user's engagement category can be updated to reflect the change in content consumption.

A second request for a content item to be provided to the user is received (506). For example, the second request can be received from a user device after the determination that the user is in the second engagement category (whereas a first request for content may have been received when the user was in the first engagement category).

A determination is made whether the second bid is a winning bid for a second auction (508). The first auction may have been performed, for example, when the user was in the first engagement category and the second auction may be performed when the user is in the second engagement category. The second auction can be performed and a slot associated with the auction can be allocated to a content item provider according, among other factors, to provided bids and/or the relevance of a content item to content presented on a page hosting the slot. For example, the slot can be allocated to the content item provider that provided the highest bid or a highest auction score (e.g., a score that is computed as a function of a bid and/or a quality measure).

If the second bid is a winning bid, a content item is provided in response to the second request associated with the winning bid for the second auction (510). For example, the content item can be provided to a user device which submitted the request for content, for presentation on the user device.

Figure 6:
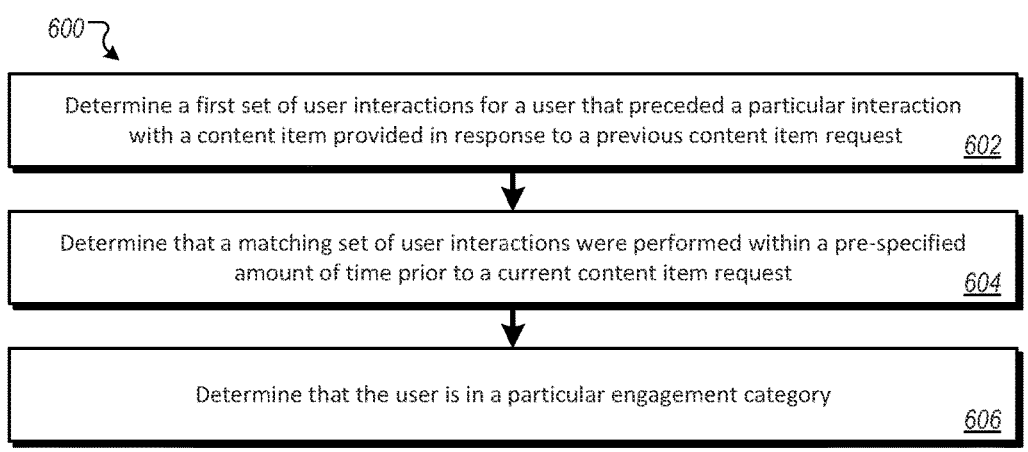
FIG. 6 is a flow chart of an example process for determining an engagement category for a user.

FIG. 6 is a flow chart of an example process 600 for determining an engagement category for a user. The process 600 can be performed by one or more data processing apparatus, such as the engagement apparatus 130 of FIG. 1. Operations of the process 600 can be implemented by execution of instructions stored on a non-transitory computer readable medium and that cause one or more data processing apparatus to perform operations of the process 600.

A first set of user interactions that preceded a particular interaction with a content item provided in response to a previous content item request is determined, based on user interaction data (602). The determination can be made, for example, based on user interaction data associated with a particular user and/or user interaction data associated with a set of users.

The particular interaction can be, for example, a conversion. A conversion can be said to occur when a user performs a particular transaction or action related to the content item. For example, a conversion may occur when a user consummates a purchase on a website to which the user was redirected in response to the user interacting with a content item. A content item provider can specify events that constitute a conversion, which can be any measurable or observable user action. Example conversions include a user downloading a white paper, navigating to at least a given depth of a website, viewing at least a certain number of webpages, spending at least a predetermined amount of time on a web site or webpage, registering on a website, or experiencing particular media.

The particular interaction can be an interaction other than a conversion. For example, the particular interaction can be the user reading a bottom-most portion of the content of a resource after having read portions above the bottom-most portion.

The first set of user interactions can include, for example, reading at least a threshold amount (e.g., 50%) of the content of a resource. For example, the user interaction data may indicate that the particular user or that users in general tend to be more likely to perform the particular interaction (e.g., a conversion) after reading at least the threshold amount of the resource.

As another example, the first set of user interactions can include, for example, a scrolling-up interaction that follows one or more previous scrolling-down interactions. The user interaction data may indicate, for example, that the particular user and/or that users in general tend to be more likely to perform the particular interaction (e.g., a conversion), after scrolling down through the content and then scrolling back up through the content.

As yet another example, the first set of user interactions may indicate a change in a user's rate of consuming content from a rate associated with a content skimmer engagement category to a rate associated with a content reader engagement category. A determination may be made that the slower content consumption rate is in effect for the user for at least a predetermined amount of time (e.g., two minutes). The user interaction data may indicate, for example, that the particular user and/or that users in general tend to be more likely to perform the particular interaction after a content consumption rate slows down.

A determination is made that a matching set of user interactions were performed within a pre-specified amount of time prior to a current request for content (604). For example, the matching set of user interactions can be user interactions that match the first set of user interactions. The pre-specified amount of time can be, for example, two minutes, during a current user session, or within some other amount of time.

A determination is made that the user is in a particular engagement category based on the determination that the matching set of user interactions were performed within the pre-specified amount of time prior to the request (606). For example, a determination can be made that the user is in a likely-to-convert engagement category. Such a determination can reflect an increased likelihood that the user may perform the particular interaction (e.g., conversion), as compared to the user being in some other, different engagement category.

Figure 7:
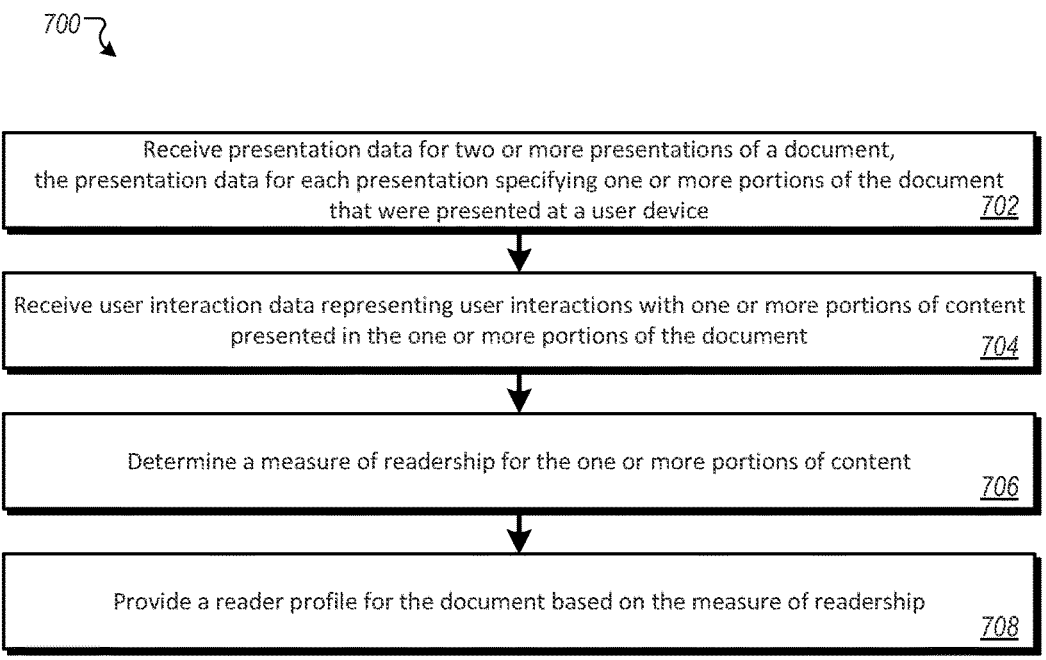
FIG. 7 is a flow chart of an example process for providing a readership profile for a document.

FIG. 7 is a flow chart of an example process 700 for providing a readership profile for a document. The process 700 can be performed by one or more data processing apparatus, such as the engagement apparatus 130 of FIG. 1. Operations of the process 700 can be implemented by execution of instructions stored on a non-transitory computer readable medium and that cause one or more data processing apparatus to perform operations of the process 700.

Presentation data for two or more presentations of a document is received (702). The presentation data for each presentation can specify one or more portions of the document that were presented at a user device. For example, the document can be a sports news web page for a sports team, and the sports news web page can include three portions, a first portion including news content relating to the team, a second portion including news content relating to the head coach of the team, and a third portion including news content relating to the players on the team.

User interaction data representing user interactions with one or more portions of content presented in the one or more portions of the document is received (704). The user interaction data can specify a type of user interaction with a portion of content and a rate at which at least one of the user interaction types occurred while the document was presented at the user device. For example, user interaction data for the sports news web page can include user interaction data that indicates that a user consumed (e.g., read) news content included in first portion (e.g., content related to the team) and news content included in the third portion (e.g., content related to the players on the team). The user interaction data can indicate, for example, that the user consumed the content included in the third portion at a slower rate (e.g., a rate corresponding to a content reader engagement category) than a rate of consumption for first portion (e.g., a rate corresponding to a content skimmer engagement category). Similar user interaction data can be received for a plurality of users.

A measure of readership for the one or more portions of content is determined (706). In some implementations, the measure of readership for each portion specifies a portion of users that read the portion of content, with the determination being based, at least in part, on a speed of occurrence for at least one user interaction being within a range corresponding to content being read. For example, for the sports news web page, a measure of readership can be determined which specifies that forty percent of users read the first portion including news content relating to the team, twenty percent of users read the second portion including news content relating to the head coach of the team, and sixty percent of users read the third portion including news content relating to the players on the team.

The measure of readership can also include information relating to multiple types of engagement categories. For example, in addition to the example percentages described above relating to portions of users that read particular portions of news content, the measure of readership can include information relating to portions of users that skimmed particular portions of news content. For instance, for the sports news web page, the measure of readership can specify that forty percent of users skim the first portion including news content relating to the team, forty five percent of users skim the second portion including news content relating to the head coach of the team, and thirty percent of users skim the third portion including news content relating to the players on the team.

A reader profile is provided for the document based on the measure of readership for the one or more portions of content (708). The reader profile can be provided, for example, to a publisher associated with the document. As another example, the reader profile can be provided to a content distribution system, for use in selecting content to be presented in one or more content slots included in the document.

Figure 8:
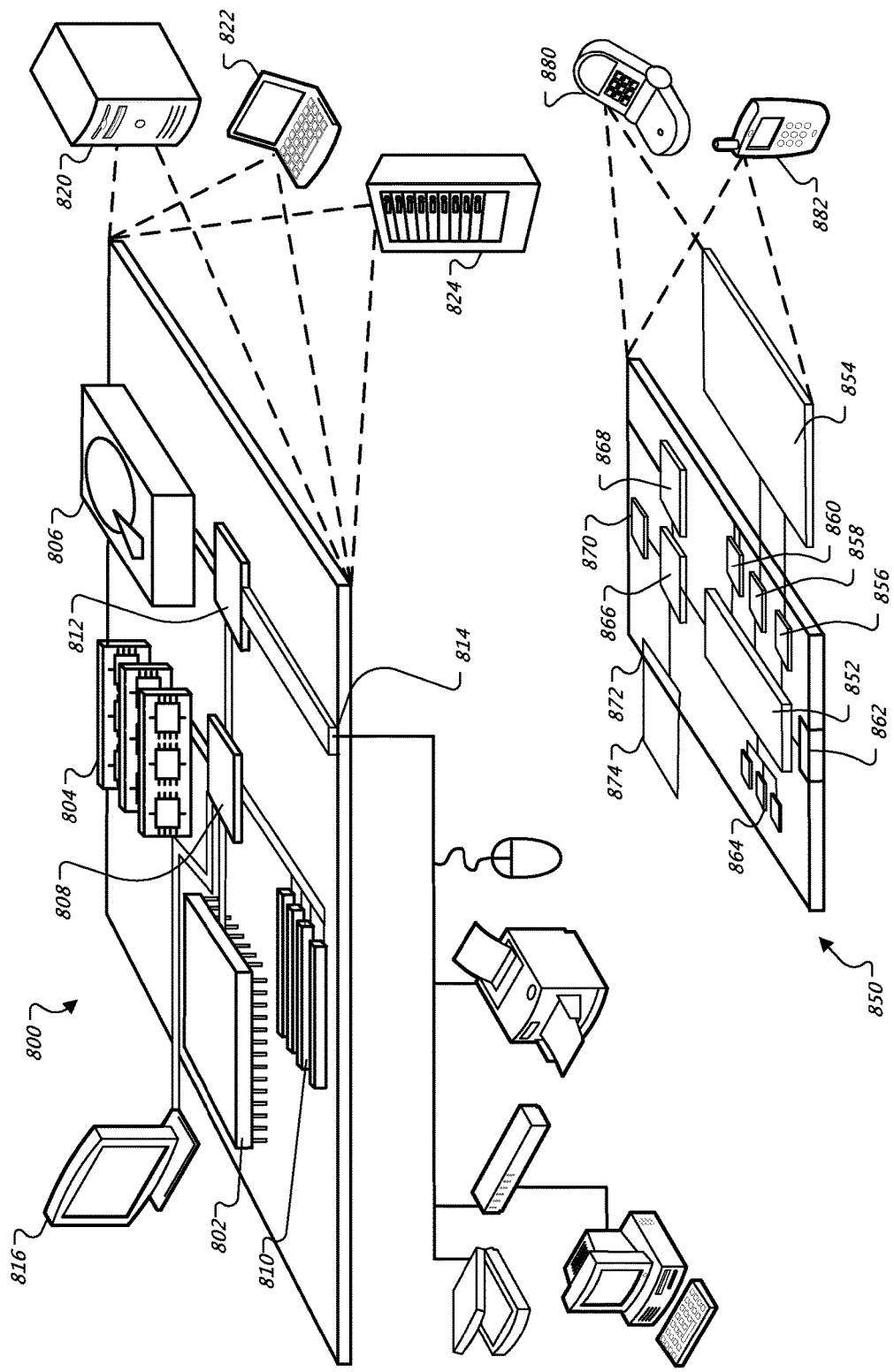
FIG. 8 is block diagram of an example computer system.

FIG. 8 is block diagram of an example computer system 800 that can be used to perform operations described above. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 can include, for example, a hard disk device, an optical disk device, a storage device that is shared over a network by multiple computing devices (e.g., a cloud storage device), or some other large capacity storage device.

The input/output device 840 provides input/output operations for the system 800. In one implementation, the input/output device 840 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 860. Other implementations, however, can also be used, such as mobile computing devices, mobile communication devices, set-top box television client devices, etc.

Although an example processing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   receiving, for a user, interaction data generated by a script embedded in a resource based on interactions with content of the resource;
   determining, using the interaction data generated by the script, at least one of an amount of time that the content was on-screen or an amount of the resource viewed;
   determining, using the interaction data generated by the script, input device interactions comprising at least one of cursor interaction with the content, selection of the content, or scrolling of the resource; and
   determining a first rate of engagement with the resource based at least in part on the input device interactions and the at least one of the amount of time that the content was on-screen or the amount of the resource viewed;
   receiving a request for a content item that can be read by the user;
   determining, based on the interaction data, the user as being in a first engagement category from at least two different engagement categories by matching the first rate of engagement to a rate of engagement associated with the first engagement category; and
   selecting a content item to present to the user in response to the request based at least in part on determining that the user is in the first engagement category.

2. The method of claim 1, comprising:
   receiving, from the content item provider, distribution criteria specifying that the content item is eligible to be provided to users that are associated with the first engagement category;
   receiving, from the content item provider, a first bid specifying a first amount that the content item provider is willing to pay for distribution of the content item to the user in the first engagement category;
   receiving, from the content item provider, distribution criteria specifying that the content item is eligible to be provided to users that are associated with a second engagement category, the second engagement category corresponding to a lower level of engagement with content of the resource than the first engagement category; and
   receiving, from the content item provider, a second bid specifying a second amount that the content item provider is willing to pay for distribution of the content item to a user in the second engagement category, the second bid being different than the first bid.

3. The method of claim 2, comprising:
   receiving updated interaction data indicating interactions of the user with the resource or a second resource;
   determining, based on the updated interaction data, that the user is in the second engagement category;
   receiving a second request for a content item to be provided to the user;

determining whether the second bid is a winning bid for a second auction; and providing, in response to the second request, a content item associated with the winning bid for the second auction.

4. The method of claim 3, wherein:

receiving updated interaction data comprises receiving interaction data that deviates from a reference set of interaction data for the user; and determining that the user is in a second engagement category comprises determining, based on the deviation, that the user is in the second engagement category.

5. The method of claim 2, further comprising providing a campaign management interface that enables a content item provider to select, for the first content item one or more engagement categories to be associated with the content item, the association of an engagement category with the content item indicating that the content item is eligible for distribution to users determined to be in the engagement category.

6. The method of claim 1, wherein determining that the user is in the first engagement category comprises:

determining, based on the interaction data, a first set of user interactions that preceded a particular interaction with a content item provided in response to a previous content item request;

determining that a matching set of user interactions were performed within a pre-specified amount of time prior to the request, the matching set of user interactions being user interactions that match the first set of user interactions; and determining that the user is in the first engagement category based on the determination that the matching set of user interactions were performed within the pre-specified amount of time prior to the request.

7. The method of claim 1, further comprising:

receiving presentation data for two or more presentations of a document, the presentation data for each presentation specifying a portion of the document that were presented at a user device;

receiving user interaction data representing user interactions with a portion of content presented in the portion of the document, the user interaction data specifying a type of user interaction with the portion of content and a rate at which at least one of the user interaction types occurred while the document was presented at the user device;

determining, based on the interaction data, a measure of readership for the portion of content, the measure of readership for the portion specifying a portion of users that read the portion of content, the determination being based, at least in part, on a speed of occurrence for at least one user interaction being within a range corresponding to content being read; and providing a reader profile for the document based on the measure of readership for the portion of content.

8. The method of claim 1, wherein:

the interaction data is associated with interactions occurring during a first period of time;

the request comprises a second period of time associated with the request; and the method further comprises comparing the first period of time to the second period of time, wherein the step of determining the user as being in the first engagement category is performed in response to identifying a correlation between the first period of time and the second period of time.

9. The method of claim 1, wherein the engagement categories are each associated with context information, the request for the content item includes first context information describing the context of the request, and determining that the user is in the first engagement category comprises matching the first context information to second context information associated with the first engagement category.

10. The method of claim 9, wherein the first context information includes at least one of a time of day of the request, a day of week of the request, a time of year of the request, a location of the request, or a type of content included in the resource.

11. The method of claim 9, wherein the first set of interaction data specifies aggregate user interaction data for multiple different users.

12. The method of claim 9, further comprising modifying content of the resource based on determining that the user is in the first engagement category.

13. A non-transitory computer storage medium encoded with a computer program, the program comprising instructions that when executed by one or more data processing apparatus cause the one or more data processing apparatus to perform operations comprising:

receiving, for a user, interaction data generated by a script embedded in a resource based on interactions with content of the resource;

determining, using the interaction data generated by the script, at least one of an amount of time that the content was on-screen or an amount of the resource viewed;

determining, using the interaction data generated by the script, input device interactions comprising at least one of cursor interaction with the content, selection of the content, or scrolling of the resource; and determining a first rate of engagement with the resource based at least in part on the input device interactions and the at least one of the amount of time that the content was on-screen or the amount of the resource viewed;

receiving a request for a content item to be provided to the user;

determining, based on the interaction data, the user as being in a first engagement category from at least two different engagement categories by matching the first rate of engagement to a rate of engagement associated with the first engagement category; and selecting a content item to present to the user in response to the request based at least in part on determining that the user is in the first engagement category.

14. The computer storage medium of claim 13, wherein the instructions cause the one or more data processing apparatus to perform operations comprising:

receiving, from the content item provider, distribution criteria specifying that the content item is eligible to be provided to users that are associated with the first engagement category;

receiving, from the content item provider, a first bid specifying a first amount that the content item provider is willing to pay for distribution of the content item to the user in the first engagement category;

receiving, from the content item provider, distribution criteria specifying that the content item is eligible to be provided to users that are associated with a second engagement category, the second engagement category corresponding to a lower level of engagement with content of the resource than the first engagement category; and receiving, from the content item provider, a second bid specifying a second amount that the content item provider is willing to pay for distribution of the content item to a user in the second engagement category, the second bid being different than the first bid.

15. The computer storage medium of claim 13, wherein the instructions cause the one or more data processing apparatus to perform operations comprising:
receiving updated interaction data indicating interactions of the user with the resource or a second resource;
determining, based on the updated interaction data, that the user is in the second engagement category;
receiving a second request for a content item to be provided to the user;
determining whether the second bid is a winning bid for a second auction; and
providing, in response to the second request, a content item associated with the winning bid for the second auction.

16. The computer storage medium of claim 13, wherein the instructions cause the one or more data processing apparatus to perform operations comprising:
providing a campaign management interface that enables a content item provider to select, for the content item, one or more engagement categories to be associated with the content item, the association of an engagement category with the content item indicating that the content item is eligible for distribution to users determined to be in the engagement category.

17. A system comprising:
a data storage device storing a content item provided by a content item provider; and
one or more data processing apparatus that interact with the data storage device and execute instructions that cause the one or more data processing apparatus to perform operations comprising:
receiving, for a user, interaction data generated by a script embedded in a resource based on interactions with content of the resource;
determining, using the interaction data generated by the script, at least one of an amount of time that the content was on-screen or an amount of the resource viewed;
determining, using the interaction data generated by the script, input device interactions comprising at least one of cursor interaction with the content, selection of the content, or scrolling of the resource; and
determining a first rate of engagement with the resource based at least in part on the input device interactions and the at least one of the amount of time that the content was on-screen or the amount of the resource viewed;
receiving a request for a content item to be provided to the user;
determining, based on the interaction data, the user as being in a first engagement category from at least two different engagement categories by matching the first rate of engagement to a rate of engagement associated with the first engagement category; and
selecting a content item to present to the user in response to the request based at least in part on determining that the user is in the first engagement category.

18. The system of claim 17, wherein the instructions cause the one or more data processing apparatus to perform operations comprising:
receiving, from the content item provider, distribution criteria specifying that the content item is eligible to be provided to users that are associated with the first engagement category;
receiving, from the content item provider, a first bid specifying a first amount that the content item provider is willing to pay for distribution of the content item to the user in the first engagement category;
receiving, from the content item provider, distribution criteria specifying that the content item is eligible to be provided to users that are associated with a second engagement category, the second engagement category corresponding to a lower level of engagement with content of the resource than the first engagement category; and
receiving, from the content item provider, a second bid specifying a second amount that the content item provider is willing to pay for distribution of the content item to a user in the second engagement category, the second bid being different than the first bid.

19. The system of claim 17, wherein the instructions cause the one or more data processing apparatus to perform operations comprising:
receiving updated interaction data indicating interactions of the user with the resource or a second resource;
determining, based on the updated interaction data, that the user is in the second engagement category;
receiving a second request for a content item to be provided to the user;
determining whether the second bid is a winning bid for a second auction; and
providing, in response to the second request, a content item associated with the winning bid for the second auction.

20. The system of claim 17, wherein the instructions cause the one or more data processing apparatus to perform operations comprising:
providing a campaign management interface that enables a content item provider to select, for the content item, one or more engagement categories to be associated with the content item, the association of an engagement category with the content item indicating that the content item is eligible for distribution to users determined to be in the engagement category.

* * * * *